(12) United States Patent
Haspiel et al.

(10) Patent No.: US 12,545,234 B2
(45) Date of Patent: Feb. 10, 2026

(54) SYSTEM FOR SWITCHING ELECTRIC VEHICLE BETWEEN OPERATING STATES

(71) Applicant: Ford Global Technologies, LLC, Dearborn, MI (US)

(72) Inventors: Jacob Michael Haspiel, Ann Arbor, MI (US); Martin Delonis, Northville, MI (US); Michael Lozano, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 173 days.

(21) Appl. No.: 18/468,231

(22) Filed: Sep. 15, 2023

(65) Prior Publication Data

US 2025/0091568 A1   Mar. 20, 2025

(51) Int. Cl.
*B60W 20/40* (2016.01)
*B60W 50/10* (2012.01)
*B60W 50/16* (2020.01)

(52) U.S. Cl.
CPC ............ *B60W 20/40* (2013.01); *B60W 50/10* (2013.01); *B60W 50/16* (2013.01)

(58) Field of Classification Search
CPC ....... B60W 20/40; B60W 50/10; B60W 50/16
See application file for complete search history.

(56) References Cited

U.S. PATENT DOCUMENTS

| | | | |
|---|---|---|---|
| 6,327,931 B1 * | 12/2001 | Skogward | F16H 61/24 74/900 |
| 10,100,919 B1 * | 10/2018 | Turney | F16H 59/0217 |
| 10,377,263 B1 * | 8/2019 | Hall | G05G 5/03 |
| 2008/0016978 A1 * | 1/2008 | Nagano | F16H 61/32 74/473.18 |
| 2010/0071496 A1 * | 3/2010 | Hanlon | G05G 9/047 74/471 XY |
| 2014/0236436 A1 * | 8/2014 | Choi | F16H 59/02 701/52 |
| 2019/0049000 A1 * | 2/2019 | Rodriguez | B60W 30/165 |
| 2019/0358535 A1 * | 11/2019 | Chen | A63F 13/803 |
| 2020/0208725 A1 * | 7/2020 | Kim | F16H 51/02 |
| 2020/0292062 A1 | 9/2020 | Kawasaki et al. | |
| 2021/0079998 A1 * | 3/2021 | Nakanishi | F16H 61/16 |
| 2021/0387530 A1 | 12/2021 | Oh et al. | |
| 2022/0041155 A1 | 2/2022 | Isami et al. | |
| 2023/0315089 A1 * | 10/2023 | Miyamoto | G05D 1/0016 701/50 |

* cited by examiner

*Primary Examiner* — Mohamad O El Sayah
(74) *Attorney, Agent, or Firm* — Burris Law, PLLC

(57) ABSTRACT

A system for switching an electric vehicle between vehicle operating states includes a base, a shifter handle, actuators, and a controller. The shifter handle includes a shaft. The actuators are coupled to the shaft. The controller is configured to determine a selected shifter operating mode from among shifter operating modes; generate, in response to the selected shifter operating mode being a first shifter operating mode, a first set of output signals to the actuators to control the actuators to permit movement of the shifter handle in a first predetermined virtual pathway; generate, in response to the selected shifter operating mode being a second shifter operating mode, a second set of output signals to the actuators to control the actuators to permit movement of the shifter handle in a second predetermined virtual pathway; and switch the electric vehicle between the vehicle operating states based on movement of the shaft.

20 Claims, 11 Drawing Sheets

1

SYSTEM FOR SWITCHING ELECTRIC VEHICLE BETWEEN OPERATING STATES

FIELD

The present disclosure relates to a system for switching an electric vehicle between a plurality of vehicle operating states.

BACKGROUND

The statements in this section merely provide background information related to the present disclosure and may not constitute prior art.

Electric vehicles differ from conventional motor vehicles because they are driven by one or more rechargeable battery packs having lithium-ion batteries, for example, or any other suitable electrical power storage units. As electric vehicles increase in power, operators may desire alternative modes and capabilities of engagement with the electric vehicle. For example, electric vehicles lack operator to vehicle physical feedback that is advantageous in conventional motor vehicles. Integration of alternative modes and capabilities of engagement with electric vehicles can be challenging.

The teachings of the present disclosure address these and other issues with alternative modes and capabilities of electric vehicles.

SUMMARY

This section provides a general summary of the disclosure and is not a comprehensive disclosure of its full scope or all of its features.

In one form, the present disclosure provides a system for switching an electric vehicle between a plurality of vehicle operating states. The system includes a base, a shifter handle, a plurality of actuators, and a controller. The shifter handle includes a knob and a shaft. The knob is mounted to a top portion of the shaft. A bottom portion of the shaft is pivotably coupled to the base. The plurality of actuators are coupled to the shaft. The controller is in communication with the plurality of actuators and configured to: determine a selected shifter operating mode from among a plurality of shifter operating modes, the plurality of shifter operating modes including a first shifter operating mode and a second shifter operating mode; generate, in response to the selected shifter operating mode being the first shifter operating mode, a first set of output signals to the plurality of actuators to control the plurality of actuators to permit movement of the shifter handle relative to the base in a first predetermined virtual pathway while inhibiting movement of the shifter handle outside of the first predetermined virtual pathway; generate, in response to the selected shifter operating mode being the second shifter operating mode, a second set of output signals to the plurality of actuators to control the plurality of actuators to permit movement of the shifter handle relative to the base in a second predetermined virtual pathway while inhibiting movement of the shifter handle outside of the second predetermined virtual pathway, the second predetermined virtual pathway being different than the first predetermined virtual pathway; and switch the electric vehicle between the plurality of vehicle operating states based on movement of the shaft.

In variations of the system of the above paragraph, which can be implemented individually or in any combination: the controller is configured to switch the electric vehicle between vehicle operating states taken from among a first subset of the plurality vehicle operating states based on movement of the shifter handle in the first virtual pathway; and switch the electric vehicle between vehicle operating states taken from among a second subset of the plurality of vehicle operating states based on movement of the shifter handle in the second virtual pathway, the second subset being different than the first subset; the vehicle operating states of the first subset correspond to at least one of: power delivery settings of an electric drive train of the electric vehicle, boost conditions, e-brake conditions, pitch settings, yaw settings, steering angles, acceleration, deceleration, vehicle lock/unlock settings, display controls, gaming controls, aerodynamic settings, camera settings, accessory settings, and drive mode; the plurality of actuators are electronic actuators; the plurality of actuators are linear actuators; the knob includes a body and a crown, the body being mounted to the shaft, the crown being coupled to the body and rotatable relative to the body, the controller is configured to determine the selected shifter operating mode based on a rotational position of the crown; the shifter handle is movable in a vertical direction between a retracted state and an extended state, the controller is configured to control movement of the shifter handle between the retracted and extended states based on the rotational position of the crown; the controller is configured to in response to the crown being in a first rotational position, position the shifter handle in the retracted state and operate a drivetrain of the electric vehicle in an automatic drive mode; and in response to the crown being in a second rotational position, position the shifter handle in the extended position and operate the drivetrain in a manual vehicle drive mode; the shifter handle is movable in a vertical direction between a retracted state and an extended state, the controller is configured to control movement of the shifter handle between the retracted and extended states; the base includes a plate and rigid supports extending downward from a periphery of the plate, the plate defining an opening in a center portion thereof, the shifter handle extends through the opening of the plate and is pivotably coupled to the plate, each actuator of the plurality of actuators is pivotably coupled to a respective rigid support of the rigid supports at a first end and pivotably coupled to the shifter handle at a second end that is opposite the first end; a haptic motor disposed within the knob; an electric motor is in communication with the controller and configured to provide a power output to drive a set of wheels of the electric vehicle, the controller is configured to limit the power output of the electric motor to a first predetermined value when the shifter handle is at a first position in the first predetermined virtual pathway, and limit the power output of the electric motor to a second predetermined value when the shifter handle is at a second position in the first predetermined virtual pathway, the first predetermined value being different than the second predetermined value; and the body of the knob includes an electronic display device, and wherein the controller is configured to instruct the electronic display device to display a visual indicator that corresponds to the selected shifter operating mode.

In another form, the present disclosure provides a system for switching an electric vehicle between a plurality of vehicle operating states. The system includes a base, a shifter handle, a plurality of electronic actuators, and a controller. The shifter handle is moveable in a vertical direction between a retracted state and an extended state and includes a knob and a shaft. The knob is mounted to a top portion of the shaft. A bottom portion of the shifter handle is pivotably coupled to the base. The plurality of electronic actuators are coupled to the shaft. The controller is in communication with the plurality of actuators and configured to: determine a selected shifter operating mode from among a plurality of shifter operating modes, the plurality of shifter operating modes including a first shifter operating mode and a second shifter operating mode; generate, in response to the selected shifter operating mode being the first shifter operating mode, a first set of output signals to the plurality of actuators to control the plurality of actuators to permit movement of the shifter handle relative to the base in a first predetermined virtual pathway while inhibiting movement of the shifter handle outside of the first predetermined virtual pathway; generate, in response to the selected shifter operating mode being the second shifter operating mode, a second set of output signals to the plurality of actuators to control the plurality of actuators to permit movement of the shifter handle relative to the base in a second predetermined virtual pathway while inhibiting movement of the shifter handle outside of the second predetermined virtual pathway, the second predetermined virtual pathway being different than the first predetermined virtual pathway; and switch the electric vehicle between the plurality of vehicle operating states based on movement of the shaft. The knob includes a body and a crown. The body being mounted to the shaft. The crown is coupled to the body and rotatable relative to the body. The controller is configured to determine the selected shifter operating mode based on a rotational position of the crown. The controller is configured to control movement of the shifter handle between the retracted state and the extended state.

In variations of the system of the above paragraph, which can be implemented individually or in any combination: the controller is configured to switch the electric vehicle between vehicle operating states taken from among a first subset of the plurality vehicle operating states based on movement of the shifter handle in the first virtual pathway and switch the electric vehicle between vehicle operating states taken from among a second subset of the plurality of vehicle operating states based on movement of the shifter handle in the second virtual pathway, the second subset being different than the first subset; the vehicle operating states of the first subset correspond to at least one of: power delivery settings of an electric drive train of the electric vehicle, boost conditions, e-brake conditions, pitch settings, yaw settings, steering angles, acceleration, deceleration, vehicle lock/unlock settings, display controls, gaming controls, aerodynamic settings, camera settings, accessory settings, and drive mode; an electric motor is in communication with the controller and configured to provide a power output to drive a set of wheels of the electric vehicle, the controller is configured to limit the power output of the electric motor to a first predetermined value when the shifter handle is at a first position in the first predetermined virtual pathway and limit the power output of the electric motor to a second predetermined value when the shifter handle is at a second position in the first predetermined virtual pathway, the first predetermined value being different than the second predetermined value; the body of the knob includes an electronic display device, and the controller is configured to instruct the electronic display device to display a visual indicator that corresponds to the selected shifter operating mode.

In yet another form, the present disclosure provides a method for switching an electric vehicle between a plurality of vehicle operating states. The method includes determining a selected shifter operating mode from among a plurality of shifter operating modes, the plurality of shifter operating modes including a first shifter operating mode and a second shifter operating mode; generating, in response to the selected shifter operating mode being the first shifter operating mode, a first set of output signals to a plurality of actuators to control the plurality of actuators to permit movement of a shifter handle relative to a base in a first predetermined virtual pathway while inhibiting movement of the shifter handle outside of the first predetermined virtual pathway; generating, in response to the selected shifter operating mode being the second shifter operating mode, a second set of output signals to the plurality of actuators to control the plurality of actuators to permit movement of the shifter handle relative to the base in a second predetermined virtual pathway while inhibiting movement of the shifter handle outside of the second predetermined virtual pathway, the second predetermined virtual pathway being different than the first predetermined virtual pathway; and switching the electric vehicle between the plurality of vehicle operating states based on movement of the shaft.

In variations of the method of the above paragraph, which can be implemented individually or in any combination: the method further includes switching the electric vehicle between vehicle operating states taken from among a first subset of the plurality vehicle operating states based on movement of the shifter handle in the first virtual pathway; switching the electric vehicle between vehicle operating states taken from among a second subset of the plurality of vehicle operating states based on movement of the shifter handle in the second virtual pathway, the second subset being different than the first subset; moving the shifter handle vertically to a retracted state to operate a drivetrain of the electric vehicle in an automatic drive mode in response to a crown of the knob being in a first rotational position of a plurality of rotational positions; the vehicle operating states of the first subset correspond to at least one of: power delivery settings of an electric drive train of the electric vehicle, boost conditions, e-brake conditions, pitch settings, yaw settings, steering angles, acceleration, deceleration, vehicle lock/unlock settings, display controls, gaming controls, aerodynamic settings, camera settings, accessory settings, and drive mode; an electric motor is in communication with the controller and configured to provide a power output to drive a set of wheels of the electric vehicle, and moving the shifter handle vertically to an extended state to operate the drivetrain of the electric vehicle in a manual vehicle drive mode in response to the crown of the knob being in a second rotational position of the plurality of rotational positions.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
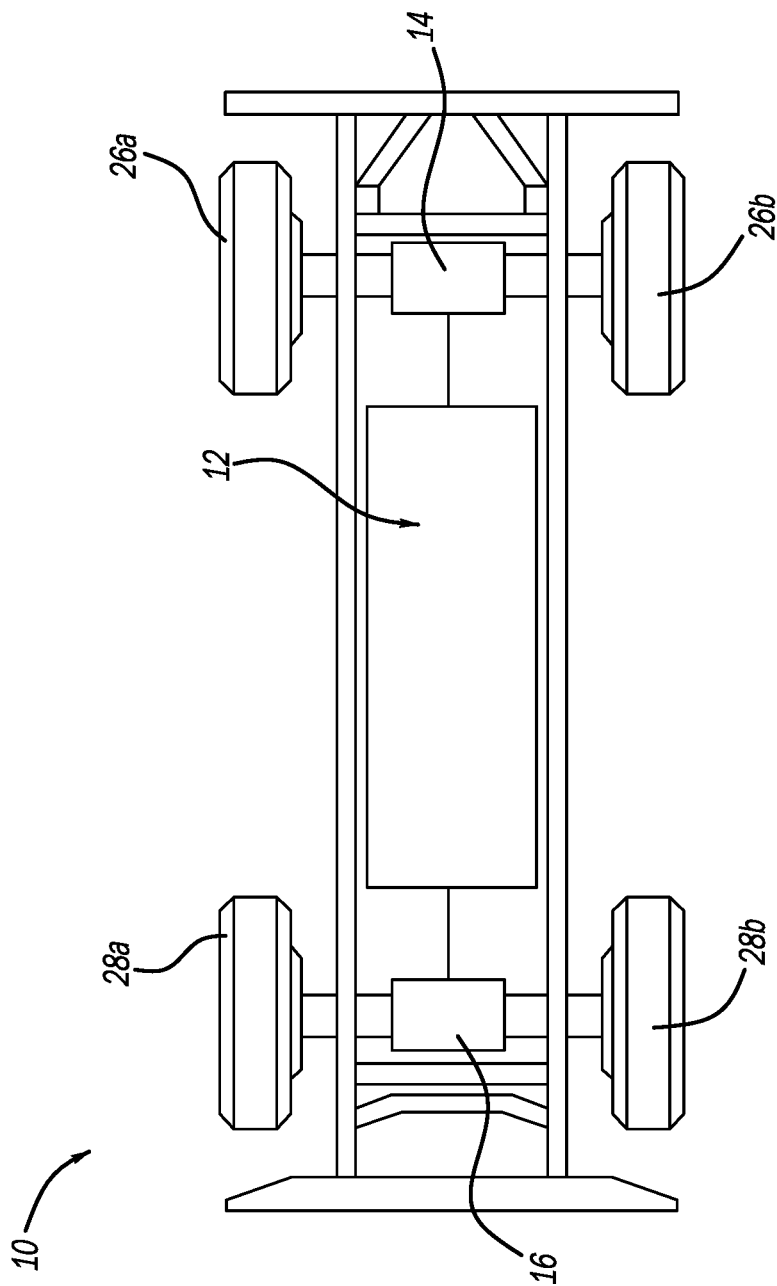
FIG. 1 is a schematic view of a vehicle including a battery pack and motors according to the principles of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
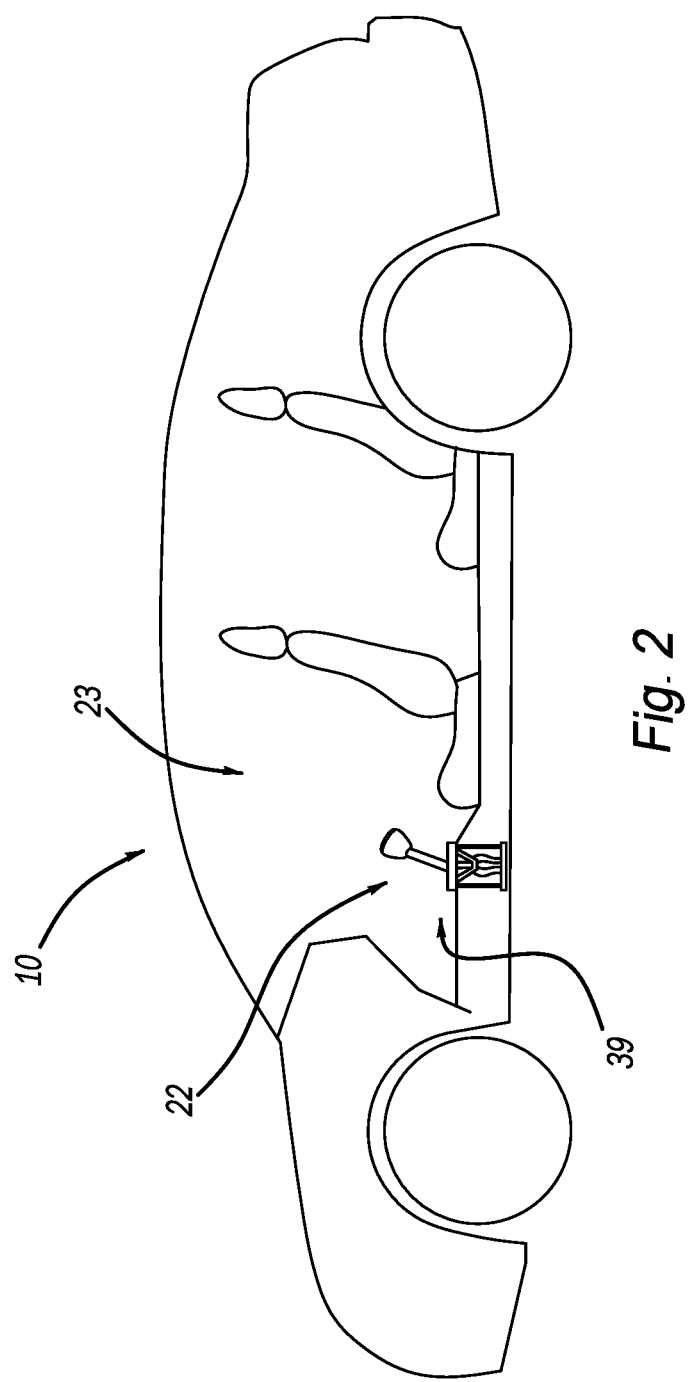
FIG. 2 is a side view of the vehicle of FIG. 1 including a shifter assembly according to the principles of the present disclosure.

With reference to FIGS. 1 and 2, a vehicle 10 such as an electric vehicle is provided. In the example provided, the electric vehicle is a battery electric vehicle (BEV). In other examples, the electric vehicle may be a hybrid electric vehicle (HEV), a plug-in electric vehicle (PHEV), or a fuel cell vehicle, among others. The vehicle 10 includes a battery pack or battery structure 12 (FIG. 1), a first or rear motor 14 (FIG. 1) such as an electric motor, a second or front motor 16 (FIG. 1) such as an electric motor, and a shifter assembly 22 (FIG. 2). The battery pack 12 may be rechargeable and may include lithium-ion batteries or any other suitable electrical power storage units. The battery pack 12 may be disposed at various locations of the vehicle 10 and may be mounted to a vehicle frame. In this way, the battery pack 12 is supported by the vehicle frame and is remote from a passenger cabin (not shown) and cargo compartments (not shown) of the vehicle 10, therefore, not occupying space that would otherwise be available for passengers or cargo. The battery pack 12 powers the rear motor 14 to drive a set of rear wheels 26a, 26b via a rear axle. Similarly, the battery pack 12 powers the front motor 16 to selectively drive a set of front wheels 28a, 28b via a front axle. In other forms, not specifically shown, the vehicle 10 may only include the front motor 16 or the rear motor 14. The first and second motors 14, 16, the front and rear axles, and a transmission (not shown) form an electric drivetrain of the vehicle 10.

Figure 3:
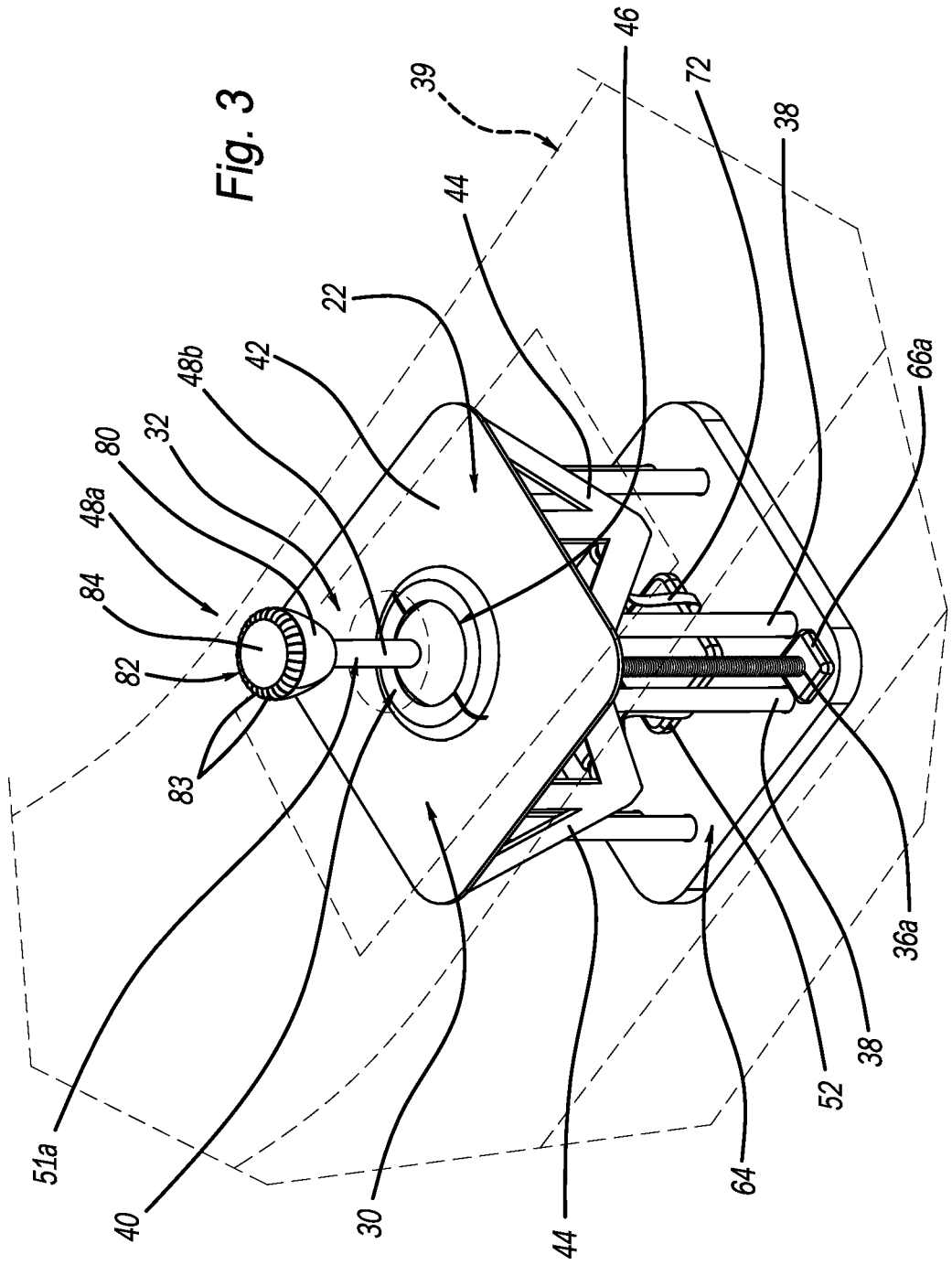
FIG. 3 is a top perspective view of the shifter assembly of FIG. 2 with a base of the shifter assembly in an extended position and a shifter handle of the shifter assembly in an extended state.
Figure 4:
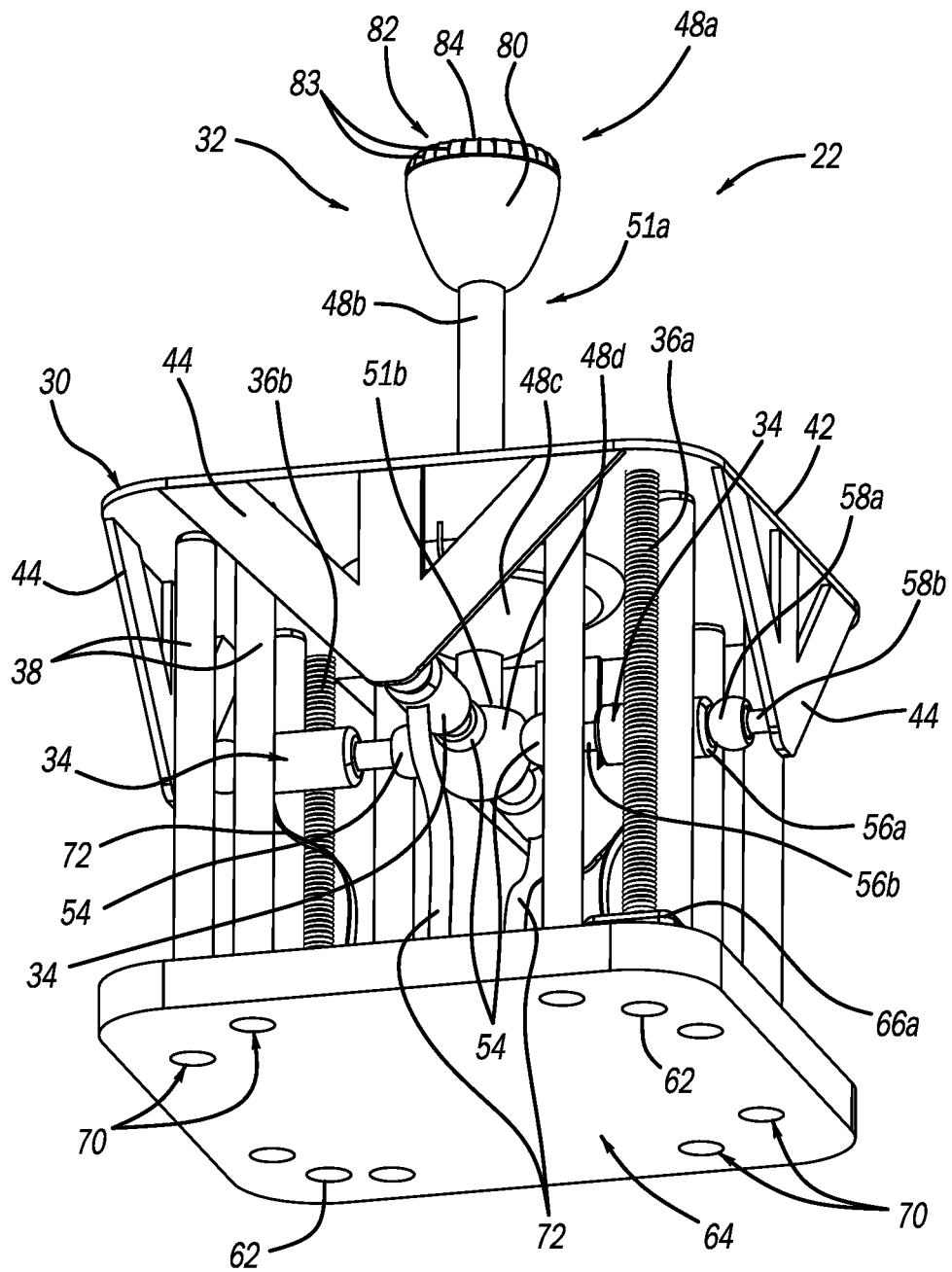
FIG. 4 is a bottom perspective view of the shifter assembly of FIG. 2 with the base of the shifter assembly in the extended position and the shifter handle of the shifter assembly in the extended state.

With reference to FIG. 2, the shifter assembly 22 is disposed at a center console 39 located in a front row 23 of the vehicle 10. The shifter assembly 22 may be mounted to a stationary structure of the vehicle 10 such as a vehicle floor, for example. With reference to FIGS. 3 and 4, the shifter assembly 22 includes a base 30, a shifter handle 32, a plurality of actuators 34 (FIG. 4), one or more vertical drive posts 36a, 36b, and one or more vertical guide posts 38. One or more components or parts of the shifter assembly 22 may be located within a transmission tunnel of the vehicle 10 such that the components are hidden from view and inaccessible by occupants located in an occupant cabin of the vehicle 10. For example, the shifter handle 32 is the only part of the shifter assembly 22 that may be accessible by an occupant in the occupant cabin and the base 30, the plurality of actuators 34, the vertical drive posts 36a, 36b and the vertical guide posts 38 may be hidden and inaccessible by an occupant in the occupant cabin.

Figure 5:
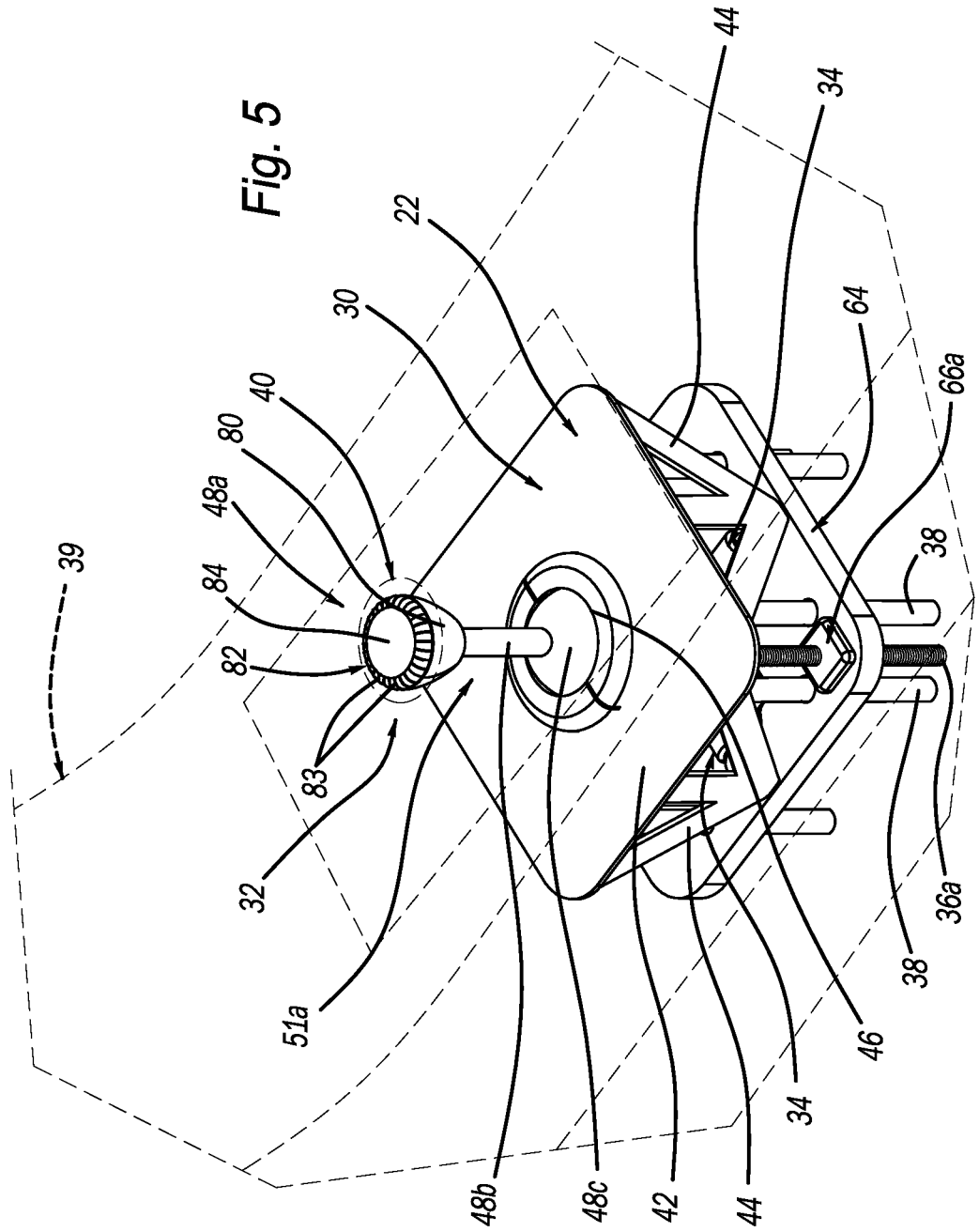
FIG. 5 is a top perspective view of the shifter assembly of FIG. 2 with the base of the shifter assembly in a retracted position and the shifter handle of the shifter assembly in the retracted state.
Figure 6:
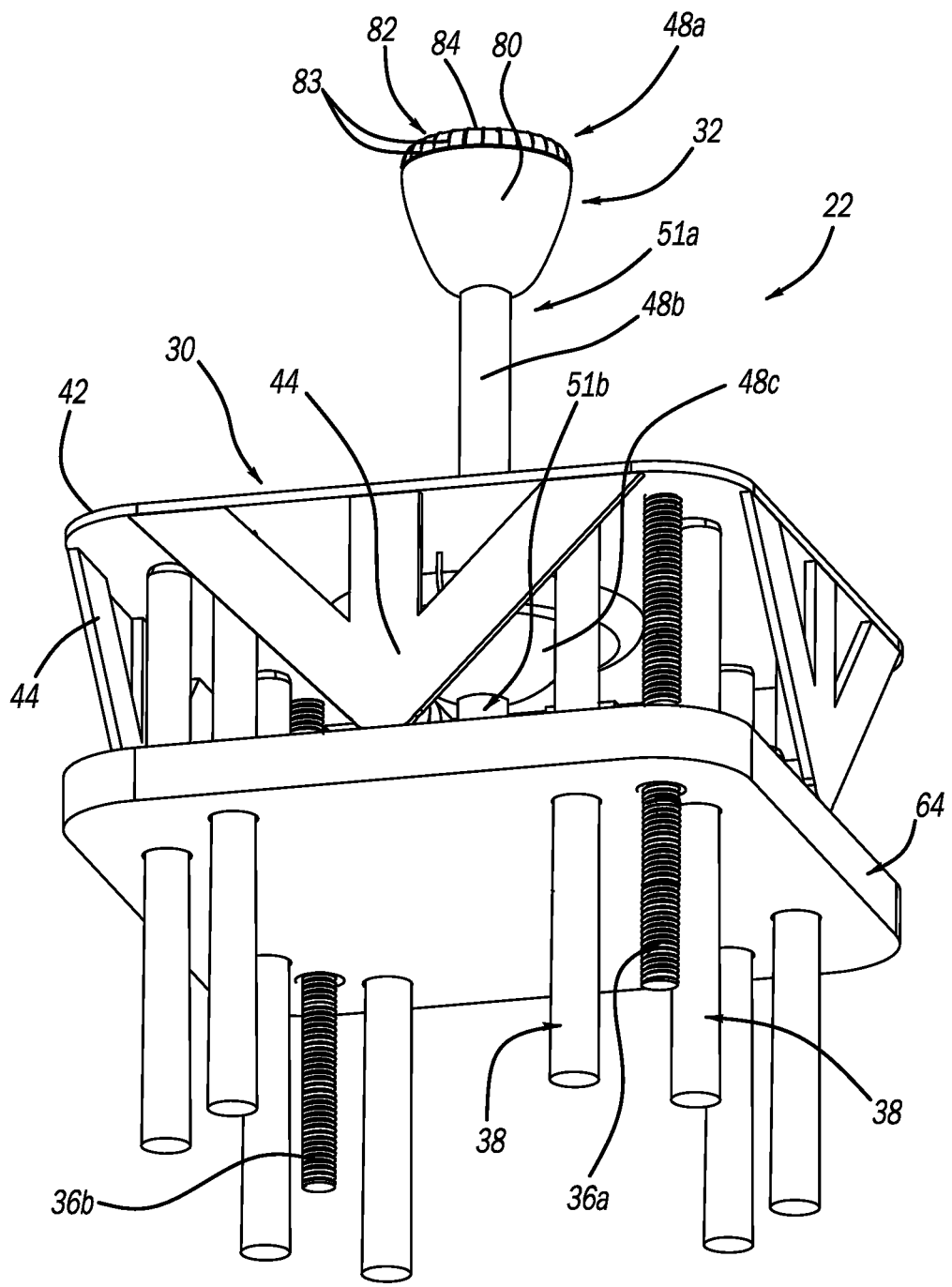
FIG. 6 is a bottom perspective view of the shifter assembly of FIG. 2 with the base of the shifter assembly in the retracted position and the shifter handle of the shifter assembly in the retracted state.

With additional reference to FIGS. 5 and 6, the base 30 is moveable vertically between a retracted position in which the shifter handle 32 is located at least partially within an opening 40 (FIG. 5) of the center console 39, and an extended position (FIGS. 3 and 4) in which the shifter handle 32 extends through the opening 40 (FIG. 3) of the center console 39. It should be understood that the shifter handle 32 is accessible by an occupant within the occupant cabin when the base 30 is in the retracted position and the extended position. The base 30 includes a plate 42 and a plurality of supports 44. In the example illustrated, the plate 42 includes an opening 46 (FIG. 5) extending therethrough. The opening 46 extends through the plate 42 near or at a center portion of the plate 42. The opening 46 is vertically aligned with the opening 40 of the center console 39 and is configured to receive the shifter handle 32. In the example illustrated, the plate 42 has a square shape when viewed from the top. In some forms, the plate 42 may have a rectangular shape, a circular shape, or any other suitable shape.

In the example illustrated, each support 44 has a triangular shape when viewed from a corresponding side of the shifter assembly 22. The supports 44 are positioned around a periphery of the plate 42 and extend downward from the periphery of the plate 42. In some forms, the supports 44 may have a semi-circular shape, a rectangular shape, or any other suitable shape. The supports 44 are rigid so as to not be able to bend or be forced out of shape when a force is applied by the operation of the actuators 34 and the shifter handle 32 via the actuators 34. In some forms, one support (not shown) may extend downward from and around the periphery of the plate 42 instead of a plurality of rigid supports 44 extending downward from and disposed around the periphery of the plate 42.

Figure 7:
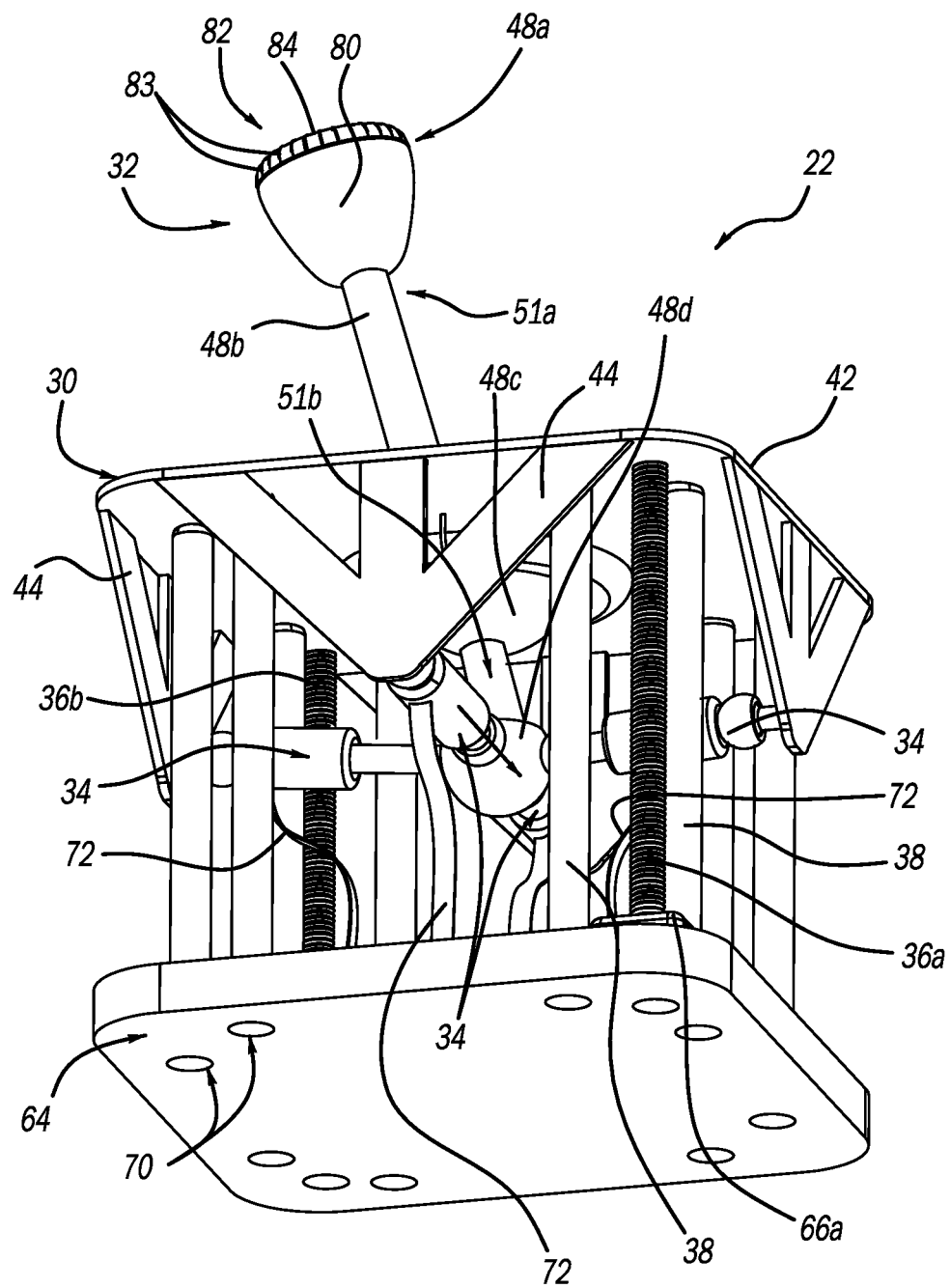
FIG. 7 is a bottom perspective view of the shifter assembly of FIG. 2 with the base of the shifter assembly in the extended position and the shifter handle of the shifter assembly in the extended state, and with the shifter handle pivoted relative to the base.

The shifter handle 32 extends through the opening 46 of the plate 42 and is coupled to the plate 42. In this way, the shifter handle 32 moves with the base 30 as the base 30 moves vertically between the retracted position and the extended position. That is, when the base 30 is in the retracted position, the shifter handle 32 is in the retracted state (FIGS. 5 and 6), and when the base 30 is in the extended position, the shifter handle 32 is in the extended state (FIGS. 3 and 4). With reference to FIG. 7, the shifter handle 32 is pivotably coupled to the plate 42 such that the shifter handle 32 may move relative to the base 30 in a plurality of predetermined virtual pathways, which is described in more detail below. The shifter handle 32 includes a knob 48a, a shaft 48b, base pivot portion 48c, and an actuator pivot portion 48d.

The knob 48a is disposed at an upper end 51a of the shaft 48b and is configured to be graspable by a driver of the vehicle 10. In some forms, a motor 50 (FIG. 9) is disposed within the knob 48a of the handle 32 and is configured to provide tactical feedback to the knob 48a by using vibrations, thereby providing an enhanced user experience to the driver based on an operating mode of the vehicle 10. In one form, the motor 50 is a haptic motor, for example.

In the example illustrated, the knob 48a includes a body 80 and a rotatable crown 82. The body 80 is mounted to the upper end 51a of the shaft 48b. The crown 82 is coupled to the body 80 and rotatable relative to the body 80 among a plurality of rotational positions. In the example illustrated, gripping features 83 are circumferentially spaced apart from each other around the crown 82. In this way, grasping and rotating of the crown 82 is facilitated. In some forms, the gripping features 83 are made of an elastomeric material such as rubber, for example.

In some configurations, the crown 82 is moveable between a locked position and an unlocked position. That is, when the crown 82 is in the locked position, the crown 82 is inhibited from rotating relative to the body 80 among the plurality of rotational positions, and when the crown 82 is in the unlocked position, the crown 82 is permitted to rotate relative to the body 80 among the plurality of rotational positions. In such configurations, a predetermined downward force may be applied to the crown 82 to move the crown 82 from the locked position to the unlocked position, thereby permitting the crown 82 to rotate relative to the body 80 among the plurality of rotational positions. In other forms, a locking mechanism (not shown) may selectively inhibit rotation of the crown 82 and be activated without downward force being applied to the crown 82. In other forms, the crown 82 may always be rotatable relative to the body 82 and not be lockable in a particular rotational position.

In some forms, the body 80 of the knob 48a includes an electronic display device 84. A controller 52 (FIG. 9) may be configured to instruct the electronic display device 84 to display a visual indicator that corresponds to a selected shifter operating mode of the vehicle 10. As will be described in more detail below, the controller 52 is configured to move the shifter handle 32 between the retracted state and the extended state based on a rotational position of the crown 82. That is, as an example, the controller 52 may move the shifter handle 32 to the retracted state and operate an electric drivetrain of the vehicle 10 in an automatic drive mode in response to the crown 82 being in a first rotational position, and may move the shifter handle 32 to the extended state and operate the electric drivetrain of the vehicle 10 in a manual drive mode in response to the crown 82 being in a second rotational position that is different from the first rotational position.

Referring back to FIGS. 5 and 6, the base pivot portion 48c is located within the opening 46 of the plate 42 and is disposed along the shaft 48b at a location between the knob 48a and the actuator pivot portion 48d. The base pivot portion 48c is also pivotably coupled to the plate 42 such that the shifter handle 32 may move in predetermined virtual pathways relative to the plate 42. In the example illustrated, the base pivot portion 48c has a spherical shape so as to form a ball joint mechanism with the plate 42. The actuator pivot portion 48d is disposed at a lower end 51b (FIGS. 4 and 7) of the shaft 48b and is configured to be pivotably coupled to the plurality of actuators 34. In the example illustrated, the actuator pivot portion 48d has a semi-spherical shape. In some forms, the actuator pivot portion 48d may have a spherical shape, for example, or any other suitable shape that permits a pivoting connection to the actuators 34. With reference to FIG. 4, a plurality of sockets 54 are disposed around the actuator pivot portion 48d and are configured to receive respective actuators 34 of the plurality of actuators 34.

The plurality of actuators 34 are pivotably coupled to the supports 44 of the base 30 at a first end and pivotably coupled to the actuator pivot portion 48d of the shifter handle 32 at a second end that is opposite the first end. The plurality of actuators 34 are configured to permit movement of the shifter handle 32 relative to the base 30 in predetermined virtual pathways. In the example illustrated, the actuators 34 are electronic, linear actuators. In the example illustrated, when the shaft 48b is in a vertical position as shown in FIGS. 3-6, two of the actuators 34 are positioned substantially parallel to each other and substantially perpendicular to at least two other actuators 34 of the plurality of actuators 34, though other configurations can be used. Each actuator 34 of the plurality of actuators 34 are also positioned between the shifter handle 32 and a respective support 44 of the base 30. It should be understood that the actuators 34 may be positioned in various directions between the support 44 and the shifter handle 32 to permit movement of the shifter handle 32 in predetermined virtual pathways. In the example illustrated, the shifter assembly 22 includes four actuators. In some forms, the shifter assembly 22 may include more than four or less than four actuators without departing from the scope of the present disclosure. One example of such a shifter handle is disclosed in the U.S. patent application Ser. No. 18/468,236, filed Sep. 15, 2023, and titled "SHIFTER ASSEMBLY FOR ELECTRIC VEHICLE" which is filed concurrently with this application and is commonly owned with the present application and the contents of which are incorporated herein by reference in its entirety.

With continued reference to FIG. 4, each actuator 34 includes, inter alia, an outer housing 56a and an inner sleeve or rod 56b that is slidably engaged with the outer housing 56a. The controller 52 may be programmed to control the actuators 34 such that the rod 56b of each actuator 34 is permitted to travel a predetermined distance relative to the outer housing 56a in response to a selected shifter operating mode, thereby allowing the shifter handle 32 to be moved in a predetermined virtual pathway. For example, if the selected shifter operating mode corresponds to a 6-speed transmission mode, then each rod 56b of the actuators 34 is permitted to travel a predetermined distance relative to the outer housing 56a (i.e., the rod 56b is permitted to go in and out of the outer housing 56a a predetermined distance) depending on a position of the shifter handle 32 to permit the shifter handle 32 to be moved from that position along the virtual pathway 61a shown in FIG. 8A, while inhibiting the shifter handle 32 from moving outside the virtual pathway 61a. The position of the shifter handle 32 can be determined in any suitable manner. In one form, the position of the shifter handle 32 along the virtual pathway 61a may be determined by one or more sensors 57 (FIG. 9) that is in communication with the controller 52. In another form, the position of the shifter handle 32 can be determined based on the relative positions of the actuators 34. In another example, if the selected shifter operating mode corresponds to an over boost mode or a sequential shifting mode, then each rod 56b of the actuators 34 is permitted to travel a predetermined distance relative to the outer housing 56a to permit the shifter handle 32 to be moved in the virtual pathway 61b shown in FIG. 8B while inhibiting the shifter handle 32 from moving outside the virtual pathway 61b. The controller 52 is programmed to provide for a plurality of shifter operating modes being selected.

In the example illustrated, the outer housing 56a has a cylindrical shape and is pivotably coupled to a respective support 44. Stated differently, an end of the outer housing 56a includes a socket 58a that is secured to a protrusion 58b extending from the respective support 44. In this way, the socket 58a and the protrusion 58b form a ball joint mechanism. The respective support 44 is rigid such that it is not forced out of shape or bent as the rod 56b slides in and out of the outer housing 56a. Although the present disclosure discloses the socket 58a as part of the outer housing 56a and the protrusion 58b as part of the support 44, it should be understood that the socket 58a may be part of the support 44 and the protrusion 58b may be part of the outer housing 56a without departing from the scope of the present disclosure. In the example illustrated, the rod 56b is pivotably coupled to a respective socket 54 of the shifter handle 32. Stated differently, an end of the rod 56b is coupled to the respective socket 54 of the shifter handle 32. In this way, the respective socket 54 and the rod 56b form a ball joint mechanism. An end of the rod 56b may have a spherical shape, for example. Although the present disclosure discloses the socket 54 as part of the shifter handle 32, it should be understood that the socket 54 may be part of the rod 56b without departing from the scope of the present disclosure.

With reference to FIGS. 4 and 6, the vertical drive posts 36a, 36b are located at and secured to an underside of the plate 42 of the base 30. In the example illustrated, the vertical drive post 36a is secured to one corner of the plate 42 and the vertical drive post 36b is secured to another corner of the plate 42 that is diagonal to the vertical drive post 36a. In some forms, the vertical drive posts 36a, 36b may be located at other positions of the plate 42 such as near a center portion of the plate 42 or at a location between corners of the plate 42. Each vertical drive post 36a, 36b is threaded along a length thereof and is received in a respective drive post aperture 62 of a plate 64 spaced apart from plate 42 (i.e., the plate 64 is located below the plate 42 of the base 30). It should be understood that although the shifter assembly 22 of the present disclosure includes two vertical drive posts 36a, 36b, the shifter assembly 22 of the present disclosure may include one vertical drive post or more than two vertical drive posts without departing from the scope of the present disclosure.

Motors 66a (only one shown in the figures) are associated with the plate 64 (e.g., disposed on a top surface of the plate 64) and are operatively coupled to respective vertical drive posts 36a, 36b. In the example illustrated, one motor 66a is operatively coupled to the vertical drive post 36a and another motor (not shown) is operatively coupled to the vertical drive post 36b. Each motor 66a is configured to rotate a gear assembly (not shown), which, in turn, drives the vertical drive post 36a, 36b in a vertical direction. In this way, the base 30 moves in a vertical direction between the extended position and the retracted position. When the base 30 is in the retracted position, the supports 44 may engage the plate 64 to inhibit further downward movement of the base 30. When the base 30 is in the extended position, the supports 44 are spaced apart from the plate 64. When the shifter handle 32 is in the retracted state, the knob 48a is located within the opening 46 of the plate 42 (FIG. 5). When the shifter handle 32 is in the extended state, the shaft 48b of the shifter handle 32 extends partially through the opening 46 of the plate 42 so that the knob 48a is located above the opening 40 of the center console 39 (FIG. 3). In some forms, each motor 66a may be covered by a cover (not shown). In an alternative form (not shown) a single motor 66a may be configured to drive more than one or all of the drive posts 36a, 36b, such as being coupled to each drive post 36a, 36b via gears, a belt and pulley mechanism, or a chain and sprocket mechanism for example.

The guide posts 38 are located at and secured to an underside of the plate 42 of the base 30. In the example illustrated, two guide posts 38 are secured at a respective corner of the plate 42. In some forms, the guide posts 38 may be located at other positions of the plate 42 such as near a center portion of the plate 42 or at a location between corners of the plate 42. The two guide posts 38 located at a respective corner of the plate 42 where one vertical drive post 36a, 36b is located is positioned on opposing sides of the vertical drive post 36a, 36b (i.e., the vertical drive post 36a, 36b is located between the two guide posts 38). The guide posts 38 assist in stabilizing the base 30 as the base 30 moves between the retracted position and the extended position. In the example illustrated, each guide post 38 is unthreaded and configured to be received in a respective guide post aperture 70 of the plate 64. It should be understood that although the shifter assembly 22 of the present disclosure includes eight guide posts 38, the shifter assembly 22 of the present disclosure may include one guide post or any number of guide posts without departing from the scope of the present disclosure.

Figure 9:
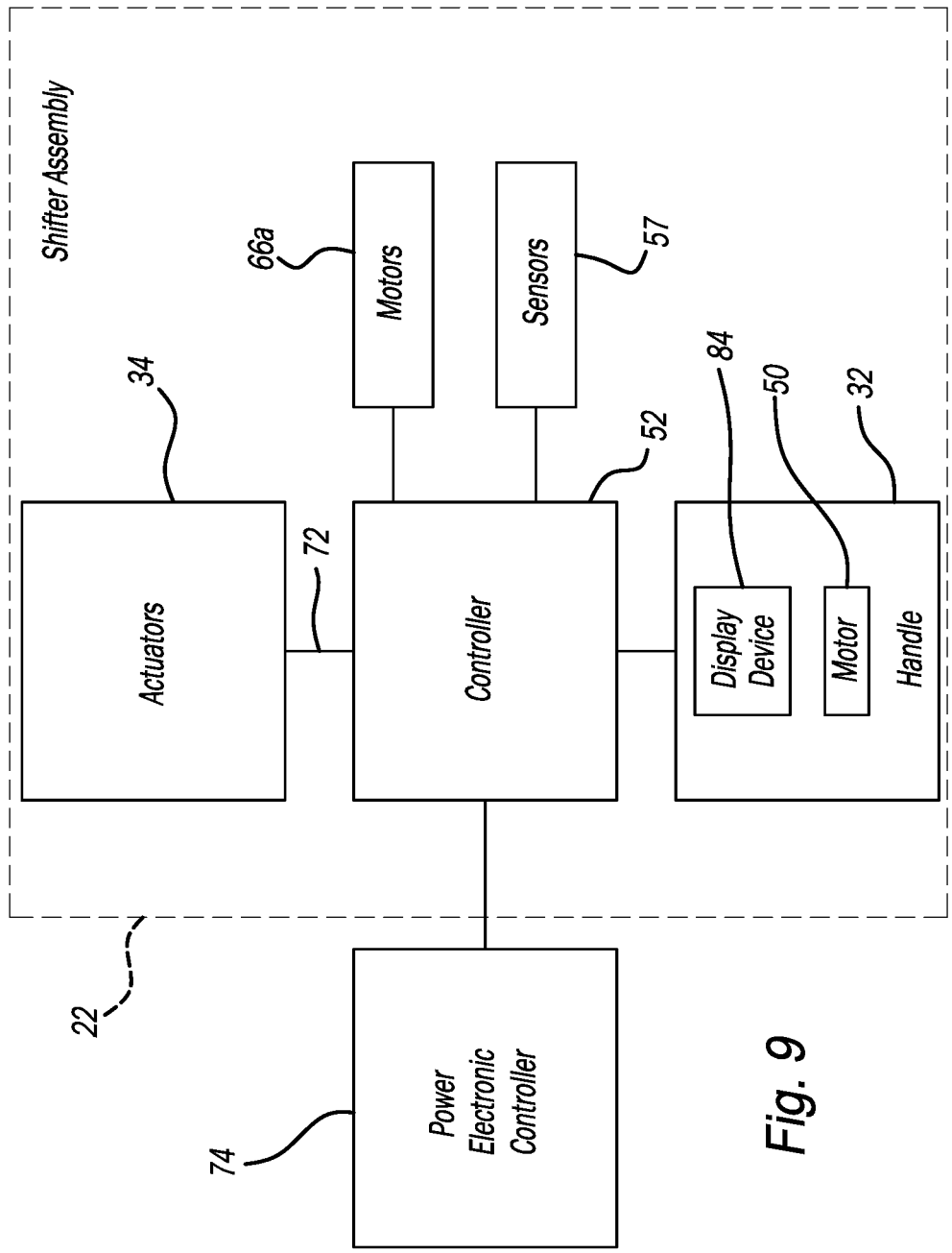
FIG. 9 is a block diagram showing components of the shifter assembly of FIG. 2.

With reference to FIGS. 3 and 9. the controller 52 is in communication with the plurality of actuators 34 and the motors 66a, and may operate the actuators 34 and the motors 66a. That is, the controller 52 may provide power and/or send instructions (i.e., output signals) to each actuator 34 including power or instructions corresponding to the predetermined distance that the rod 56b is permitted to travel relative to the outer housing 56a in response to a shifter operating mode being selected and the position of the shifter handle 32, thereby allowing the shifter handle 32 to be moved in a predetermined virtual pathway and inhibiting the shifter handle 32 from moving outside the predetermined virtual pathway. The controller 52 may be in wired or wireless communication with the actuators 34, and if included, the sensors 57. In the example illustrated, a plurality of wires 72 are connected to the controller 52 and the actuators 34, thereby permitting the controller 52 to power and/or send instructions to the actuators 34. In the example illustrated, the wires 72 are ribbon wires, which provides flexibility as the base 30 moves between the retracted position and the extended position. It should be understood that the wires 72 may be any suitable wire that may power and/or provide instructions to the actuators 34 such as a cylindrical extrusion wire, for example.

In the example illustrated, the controller 52 is located on the upper side of the plate 64 (FIG. 3). In some forms, the controller 52 may be located on another part of the shifter assembly 22 (e.g., the base 30) or may be located remote from the shifter assembly 22 such as near or at a location housing a power electronic controller 74 (FIG. 9) of the vehicle 10. The power electronic controller 74 manages the flow of electrical energy delivered by the battery pack 12, controlling the speed of the motors 14, 16 and the torque each motor 14, 16 produces. The controller 52 may be in communication with the power electronic controller 74 and may send a signal to the power electronic controller 74 to control and/or adjust the speed of the motors 14, 16 and the torque each motor 14, 16 produces.

Figure 10:
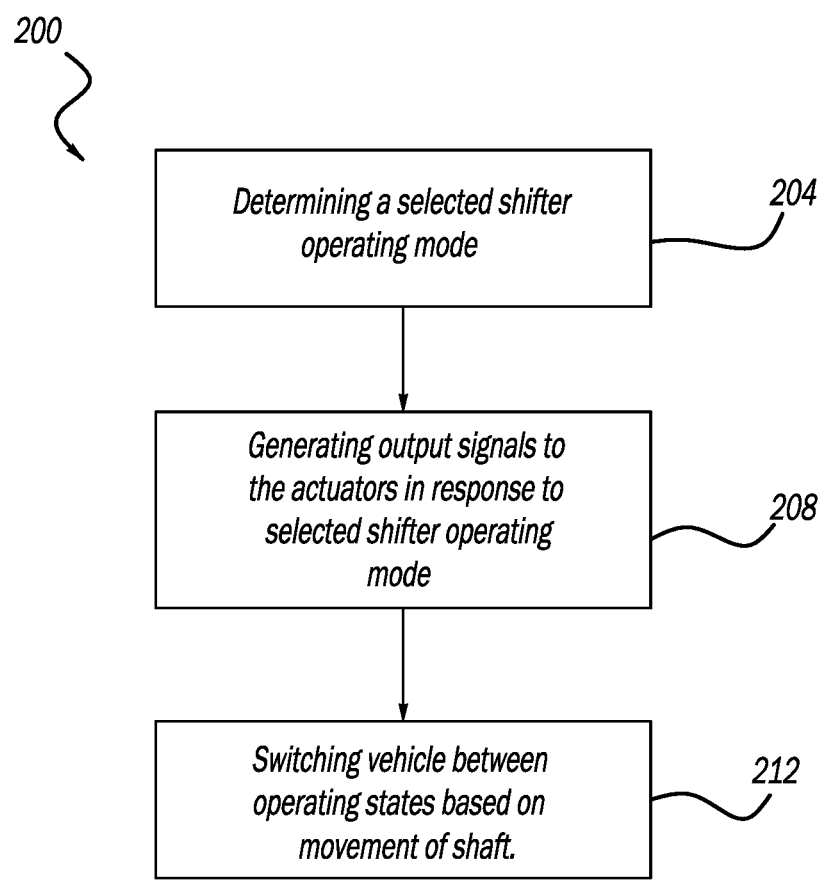
FIG. 10 is a flowchart depicting an algorithm for switching an electric vehicle between operating states in accordance with the teachings of the present disclosure, for use by the shifter assembly of FIG. 2.

With reference to FIG. 10, a flowchart 200 showing an example implementation of a control algorithm or method for switching a vehicle between operating states is shown. The vehicle operating states may be taken from among a set of vehicle operating states that include, but are not limited to: boost conditions, E-brake conditions, steering angles, gaming controls, power delivery settings, vehicle accessory conditions, dynamic conditions, aerodynamic settings, display controls, and a drive mode.

The control algorithm begins at 204 when the vehicle operator determines a selected shifter operating mode. In one example, the vehicle operator may select the shifter operating mode using a touchscreen display located at the center console 39 of the vehicle 10, for example. In another example, the vehicle operator may select the shifter operating mode using a button, knob, dial, or switch, for example, located at the center console 39 of the vehicle 10. In yet another example, the vehicle operator may select the shifter operating mode by moving the crown 82 to the unlock position and rotating the crown 82 relative to the body 80 to a desired shifter operating mode.

The shifter operating modes may include, but are not limited to: boost mode, E-brake mode, steering mode, gaming mode, power delivery mode, vehicle accessory mode, dynamic mode, aerodynamic mode, display mode, and a drive mode. The boost mode may permit the vehicle operator to control the overboost function or supercapacitor discharge control mechanism of the vehicle 10, for example. The E-brake mode may permit the vehicle operator to control the function of the E-brake in the vehicle 10, for example. The steering mode may permit the vehicle operator to steer the vehicle 10 using the shifter handle 32, for example. The gaming mode may permit the vehicle operator to control a gaming system in the vehicle 10 and displayed on the touchscreen display at the center console 39, for example. The power delivery mode may permit the vehicle operator to control power delivery of the electric drive train of the vehicle 10.

The vehicle accessory mode may permit the vehicle operator to control vehicle accessories using the shifter handle 32. For example, when the vehicle accessory mode is selected, the vehicle operator may control settings such as unlocking/locking settings, camera settings, mirror positions, infotainment settings (e.g., volume, radio station), lighting, and/or hitch settings of the vehicle 10 using the shifter handle 32. The vehicle dynamic mode may permit the vehicle operator to control pitch and/or yaw settings of the vehicle 10 using the shifter handle 32. The aerodynamic mode may permit the vehicle operator to control the position of the vehicle's body parts, for example, according to driving conditions, such as speed, acceleration, braking, and wind direction. In this way, the performance, efficiency, stability, and aesthetics of the vehicle 10 may be enhanced. The vehicle display mode may permit the vehicle operator to control the vehicle display using the shifter handle 32, for example.

The drive mode may permit the vehicle operator to operate the vehicle in a plurality of vehicle drive modes such as an automatic drive mode or a manual drive mode, for example. That is, in the automatic drive mode, the vehicle operator may rotate the crown 82 to operate the vehicle 10 in Park, Reverse, Neutral, Drive, and Low modes among others (e.g., terrain or weather specific modes, track modes). In the manual drive mode, the vehicle operator may rotate the crown 82 to manually operate between a plurality of gear speeds (e.g., 6-speed transmission, 5-speed transmission, 4-speed transmission). In some configurations, the shifter handle 32 may be in the extended state when the vehicle operator operates the vehicle 10 in the manual drive mode and the automatic drive mode. In other configurations, the shifter handle 32 is moved to the extended state to operate the electric drive train in the manual drive mode and moved to the retracted state to operate the electric drive train in the automatic drive mode.

After determining the selected shifter operating mode, the control algorithm then proceeds to 208. At 208, the control algorithm, using the controller 52, generates, in response to the selected shifter operating mode, a set of output signals to the actuators 34 to control the actuators 34 to permit movement of the shifter handle 32 in a predetermined virtual pathway while inhibiting movement of the shifter handle 32 outside of the predetermined virtual pathway. In this way, operation of the vehicle 10 in the selected shifter operating mode is permitted while inhibiting operation of the vehicle 10 in a non-selected shifter operating mode. It should be understood that each shifter operating mode may correspond to a different predetermined virtual pathway.

Figure 8A:
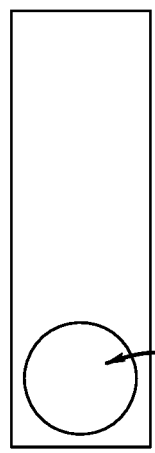
FIGS. 8A-8F are example virtual pathways based on selected vehicle modes of the shifter assembly of FIG. 2 according to the principles of the present disclosure.
Figure 8B:
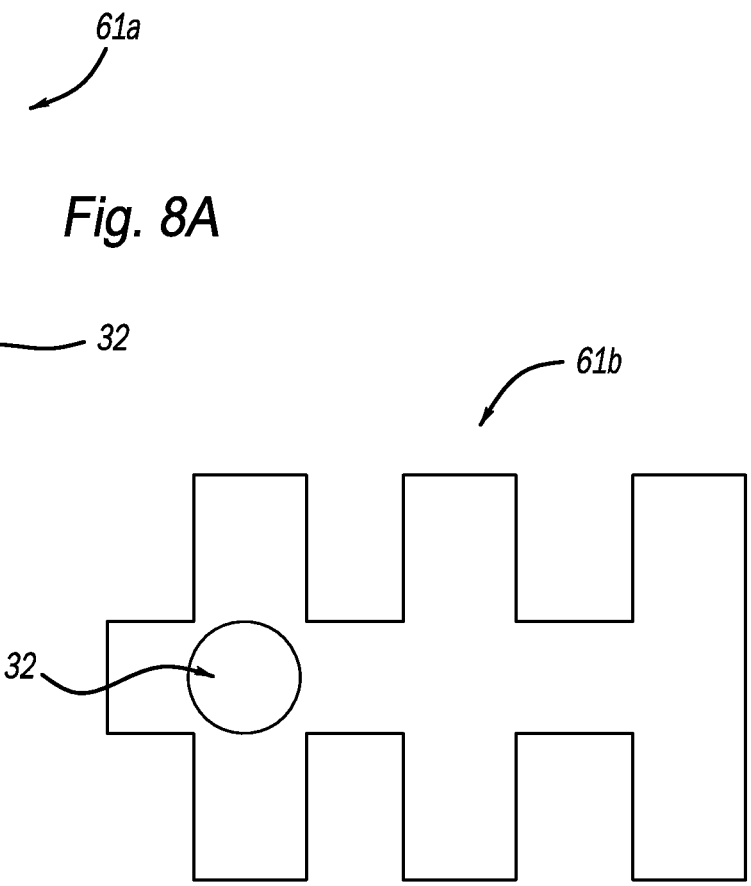
Figure 8C:
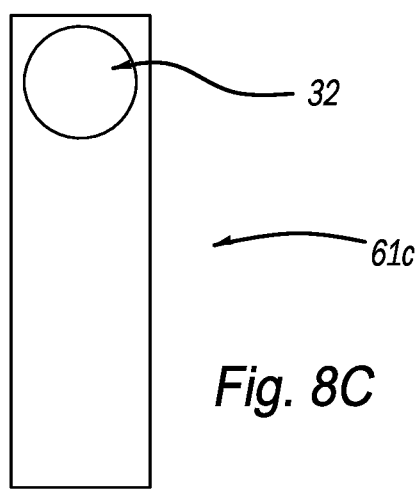
Figure 8D:
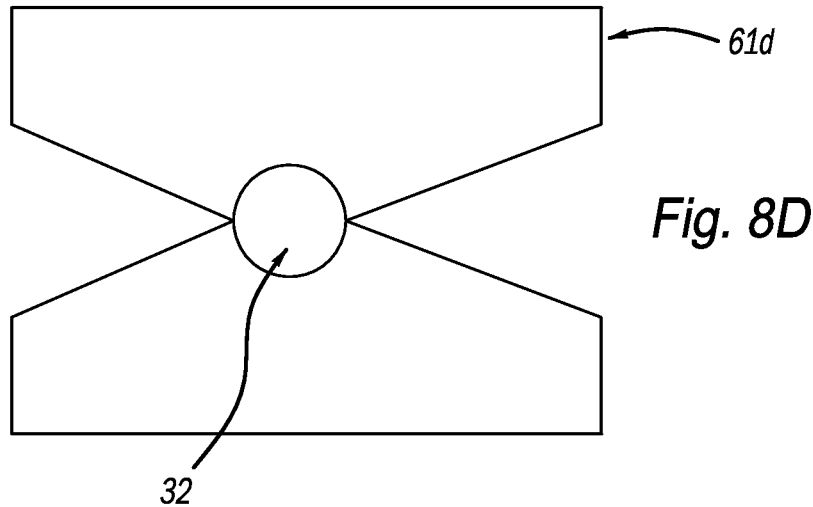
Figure 8E:
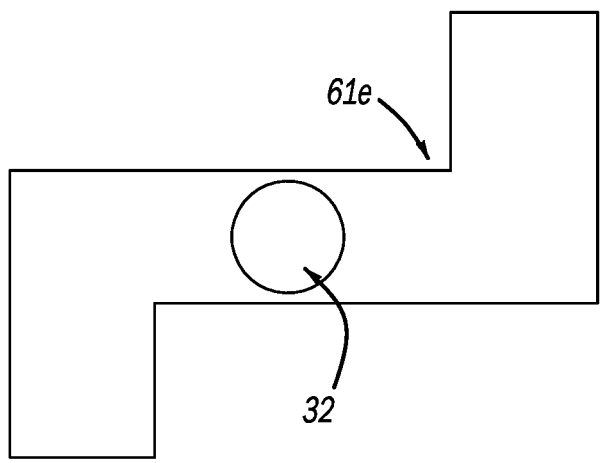
Figure 8F:
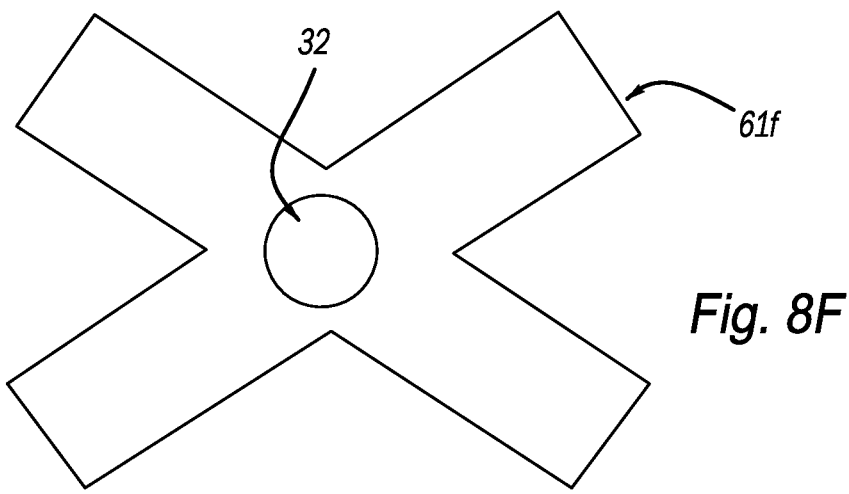

In one example, as shown in FIG. 8A, if the boost shifter operating mode is selected, then the controller 52 generates output signals to the actuators 34 to permit movement of the shifter handle 32 in predetermined virtual pathway 61*a* while inhibiting movement of the shifter handle 32 outside of the predetermined virtual pathway 61*a*. In another example, as shown in FIG. 8B, if the 6-speed manual shifter operating mode is selected, then the controller 52 generates output signals to the actuators 34 to permit movement of the shifter handle 32 in predetermined virtual pathway 61*b* while inhibiting movement of the shifter handle 32 outside of the predetermined virtual pathway 61*b*. FIGS. 8C-8F show examples of various virtual predetermined pathways that may be associated with different shifter operating modes. For example, FIG. 8C shows predetermined virtual pathway 61*c* that may correspond to an E-brake mode. For example, FIG. 8D shows predetermined virtual pathway 61*d* that may correspond to a vehicle dynamic mode. For example, FIG. 8E shows predetermined virtual pathway 61*e* that may correspond to a vehicle accessory mode. For example, FIG. 8F shows predetermined virtual pathway 61*f* that may correspond to a gaming mode. In some forms, a curved or C-shaped predetermined virtual pathway may correspond to a steering mode.

After generating the set of output signals to the actuators 34, the control algorithm then proceeds to 212. At 212, the control algorithm, using the controller 52, switches the electric vehicle 10 between operating states based on movement of the shifter handle 32 in the predetermined virtual pathway. For example, with reference to FIG. 8A, if the shifter handle 32 is moved in the predetermined virtual pathway 61*a* to a predetermined position therein, then the controller 52 switches the vehicle 10 from a non-boosted state to a boosted state. In another example, with reference to FIG. 8B, the electric motor 14, 16 is configured to provide a power output to drive a respective set of wheels 26*a*, 26*b*, 28*a*, 28*b* in response to movement of the shifter handle 32 to one or more positions in the predetermined virtual pathway 61*b*. That is, the controller 52 is configured to limit the power output of the electric motor 14, 16 to a first predetermined value when the shifter handle 32 is moved to a first position 90*a* in the predetermined virtual pathway 61*b* and limit the power output of the electric motor 14, 16 to a second predetermined value when the shifter handle 32 is moved to a second position 90*b* in the predetermined virtual pathway 61*b*. The first predetermined value is different than the second predetermined value. In this way, the electric vehicle 10 may emulate an internal combustion engine (ICE) vehicle having a manual transmission.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for switching an electric vehicle between a plurality of vehicle operating states, the system comprising:
    a base;
    a shifter handle including a knob and a shaft, the knob mounted to a top portion of the shaft, a bottom portion of the shaft being pivotably coupled to the base;
    a plurality of actuators coupled to the shaft; and
    a controller in communication with the plurality of actuators, the controller configured to:
        determine a selected shifter operating mode from among a plurality of shifter operating modes, the plurality of shifter operating modes including a first shifter operating mode and a second shifter operating mode;
        generate, in response to the selected shifter operating mode being the first shifter operating mode, a first set of output signals to the plurality of actuators to control the plurality of actuators to permit movement of the shifter handle relative to the base in a first predetermined virtual pathway while inhibiting movement of the shifter handle outside of the first predetermined virtual pathway, the plurality of actuators are configured to move in response to the shifter handle moving along the first predetermined virtual pathway to permit movement of the shifter handle in the first predetermined virtual pathway while inhibiting movement of the shifter handle outside of the first predetermined virtual pathway;
        generate, in response to the selected shifter operating mode being the second shifter operating mode, a second set of output signals to the plurality of actuators to control the plurality of actuators to permit movement of the shifter handle relative to the base in a second predetermined virtual pathway while inhibiting movement of the shifter handle outside of the second predetermined virtual pathway, the second predetermined virtual pathway being different than the first predetermined virtual pathway; and
        switch the electric vehicle between the plurality of vehicle operating states based on movement of the shaft.

2. The system of claim 1, wherein the controller is configured to:
    switch the electric vehicle between vehicle operating states taken from among a first subset of the plurality vehicle operating states based on movement of the shifter handle in the first virtual pathway; and
    switch the electric vehicle between vehicle operating states taken from among a second subset of the plurality of vehicle operating states based on movement of the shifter handle in the second virtual pathway, the second subset being different than the first subset.

3. The system of claim 2, wherein the vehicle operating states of the first subset correspond to at least one of: power delivery settings of an electric drive train of the electric vehicle, boost conditions, e-brake conditions, pitch settings, yaw settings, steering angles, acceleration, deceleration, vehicle lock/unlock settings, display controls, gaming controls, aerodynamic settings, camera settings, accessory settings, and drive mode.

4. The system of claim 1, wherein the plurality of actuators are electronic actuators.

5. The system of claim 1, wherein the plurality of actuators are linear actuators.

6. The system of claim 1, wherein the knob includes a body and a crown, the body being mounted to the shaft, the crown being coupled to the body and rotatable relative to the body, wherein the controller is configured to determine the selected shifter operating mode based on a rotational position of the crown.

7. The system of claim 6, wherein the shifter handle is movable in a vertical direction between a retracted state and an extended state, wherein the controller is configured to control movement of the shifter handle between the retracted and extended states based on the rotational position of the crown.

8. The system of claim 7, wherein the controller is configured to:
in response to the crown being in a first rotational position, position the shifter handle in the retracted state and operate a drivetrain of the electric vehicle in an automatic drive mode; and
in response to the crown being in a second rotational position, position the shifter handle in the extended state and operate the drivetrain in a manual vehicle drive mode.

9. The system of claim 1, further comprising a haptic motor disposed within the knob.

10. The system of claim 1, further comprising:
an electric motor in communication with the controller and configured to provide a power output to drive a set of wheels of the electric vehicle,
wherein the controller is configured to:
limit the power output of the electric motor to a first predetermined value when the shifter handle is at a first position in the first predetermined virtual pathway; and
limit the power output of the electric motor to a second predetermined value when the shifter handle is at a second position in the first predetermined virtual pathway, the first predetermined value being different than the second predetermined value.

11. The system of claim 1, wherein:
the knob includes a body and a crown, the body being mounted to the shaft, the crown being coupled to the body and rotatable relative to the body, wherein the controller is configured to determine the selected shifter operating mode based on a rotational position of the crown; and
the body of the knob includes an electronic display device, and wherein the controller is configured to instruct the electronic display device to display a visual indicator that corresponds to the selected shifter operating mode.

12. A system for switching an electric vehicle between a plurality of vehicle operating states, the system comprising:
a base;
a shifter handle movable in a vertical direction between a retracted state and an extended state and including a knob and a shaft, the knob mounted to a top portion of the shaft, a bottom portion of the shaft being pivotably coupled to the base;
a plurality of electronic actuators coupled to the shaft; and
a controller in communication with the plurality of actuators, the controller configured to:
determine a selected shifter operating mode from among a plurality of shifter operating modes, the plurality of shifter operating modes including a first shifter operating mode and a second shifter operating mode;
generate, in response to the selected shifter operating mode being the first shifter operating mode, a first set of output signals to the plurality of actuators to control the plurality of actuators to permit movement of the shifter handle relative to the base in a first predetermined virtual pathway while inhibiting movement of the shifter handle outside of the first predetermined virtual pathway, the plurality of actuators are configured to move in response to the shifter handle moving along the first predetermined virtual pathway to permit movement of the shifter handle in the first predetermined virtual pathway while inhibiting movement of the shifter handle outside of the first predetermined virtual pathway;
generate, in response to the selected shifter operating mode being the second shifter operating mode, a second set of output signals to the plurality of actuators to control the plurality of actuators to permit movement of the shifter handle relative to the base in a second predetermined virtual pathway while inhibiting movement of the shifter handle outside of the second predetermined virtual pathway, the second predetermined virtual pathway being different than the first predetermined virtual pathway; and
switch the electric vehicle between the plurality of vehicle operating states based on movement of the shaft,
wherein the knob includes a body and a crown, the body being mounted to the shaft, the crown being coupled to the body and rotatable relative to the body, wherein the controller is configured to determine the selected shifter operating mode based on a rotational position of the crown, and
wherein the controller is configured to control movement of the shifter handle between the retracted state and the extended state.

13. The system of claim 12, wherein the controller is configured to:
switch the electric vehicle between vehicle operating states taken from among a first subset of the plurality vehicle operating states based on movement of the shifter handle in the first virtual pathway; and
switch the electric vehicle between vehicle operating states taken from among a second subset of the plurality of vehicle operating states based on movement of the shifter handle in the second virtual pathway, the second subset being different than the first subset.

14. The system of claim 13, wherein the vehicle operating states of the first subset correspond to at least one of: power delivery settings of an electric drive train of the electric vehicle, boost conditions, e-brake conditions, pitch settings, yaw settings, steering angles, acceleration, deceleration, vehicle lock/unlock settings, display controls, gaming controls, aerodynamic settings, camera settings, accessory settings, and drive mode.

15. The system of claim 12, further comprising:
an electric motor in communication with the controller and configured to provide a power output to drive a set of wheels of the electric vehicle,
wherein the controller is configured to:
limit the power output of the electric motor to a first predetermined value when the shifter handle is at a first position in the first predetermined virtual pathway; and
limit the power output of the electric motor to a second predetermined value when the shifter handle is at a second position in the first predetermined virtual pathway, the first predetermined value being different than the second predetermined value.

16. The system of claim 12, wherein the body of the knob includes an electronic display device, and wherein the controller is configured to instruct the electronic display device to display a visual indicator that corresponds to the selected shifter operating mode.

17. A method for switching an electric vehicle between a plurality of vehicle operating states, the method comprising:

determining a selected shifter operating mode from among a plurality of shifter operating modes, the plurality of shifter operating modes including a first shifter operating mode and a second shifter operating mode;

generating, in response to the selected shifter operating mode being the first shifter operating mode, a first set of output signals to a plurality of actuators to control the plurality of actuators to permit movement of a shifter handle relative to a base in a first predetermined virtual pathway while inhibiting movement of the shifter handle outside of the first predetermined virtual pathway, the plurality of actuators are configured to move in response to the shifter handle moving along the first predetermined virtual pathway to permit movement of the shifter handle in the first predetermined virtual pathway while inhibiting movement of the shifter handle outside of the first predetermined virtual pathway;

generating, in response to the selected shifter operating mode being the second shifter operating mode, a second set of output signals to the plurality of actuators to control the plurality of actuators to permit movement of the shifter handle relative to the base in a second predetermined virtual pathway while inhibiting movement of the shifter handle outside of the second predetermined virtual pathway, the second predetermined virtual pathway being different than the first predetermined virtual pathway; and switching the electric vehicle between the plurality of vehicle operating states based on movement of the shifter handle.

18. The method of claim 17, further comprising:

switching the electric vehicle between vehicle operating states taken from among a first subset of the plurality vehicle operating states based on movement of the shifter handle in the first virtual pathway; and switching the electric vehicle between vehicle operating states taken from among a second subset of the plurality of vehicle operating states based on movement of the shifter handle in the second virtual pathway, the second subset being different than the first subset.

19. The method of claim 18, wherein the vehicle operating states of the first subset correspond to at least one of: power delivery settings of an electric drive train of the electric vehicle, boost conditions, e-brake conditions, pitch settings, yaw settings, steering angles, acceleration, deceleration, vehicle lock/unlock settings, display controls, gaming controls, aerodynamic settings, camera settings, accessory settings, and drive mode.

20. The method of claim 17, further comprising:

moving the shifter handle vertically to a retracted state to operate a drivetrain of the electric vehicle in an automatic drive mode in response to a crown of the shifter handle being in a first rotational position of a plurality of rotational positions; and moving the shifter handle vertically to an extended state to operate the drivetrain of the electric vehicle in a manual vehicle drive mode in response to the crown of the shifter handle being in a second rotational position of the plurality of rotational positions.

* * * * *